United States Patent
Smith et al.

(10) Patent No.: US 10,419,438 B2
(45) Date of Patent: Sep. 17, 2019

(54) SYSTEM, APPARATUS AND METHOD FOR AUTO-OPTIMIZATION OF ACCESS CONTROL POLICY AND KEY MANAGEMENT IN A NETWORK AUTHORING TOOL

(71) Applicant: Intel Corporation, Santa Clara, CA (US)

(72) Inventors: Ned M. Smith, Beaverton, OR (US); Shao-Wen Yang, Hillsboro, OR (US); Nathan Heldt-Sheller, Portland, OR (US); Thomas G. Willis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 547 days.

(21) Appl. No.: 14/998,275

(22) Filed: Dec. 26, 2015

(65) Prior Publication Data

US 2016/0366141 A1 Dec. 15, 2016

Related U.S. Application Data

(60) Provisional application No. 62/172,916, filed on Jun. 9, 2015.

(51) Int. Cl.
*H04L 29/08* (2006.01)
*H04L 29/06* (2006.01)
(Continued)

(52) U.S. Cl.
CPC ............ *H04L 63/101* (2013.01); *H04L 41/12* (2013.01); *H04L 63/062* (2013.01); *H04L 63/08* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2005/0120246 A1* | 6/2005 | Jang | H04L 12/2807 726/4 |
| 2008/0184030 A1* | 7/2008 | Kelly | H04L 9/3268 713/156 |
| 2015/0006719 A1* | 1/2015 | Gupta | H04L 67/16 709/224 |

FOREIGN PATENT DOCUMENTS

| | | |
|---|---|---|
| KR | 1020060081781 | 7/2006 |
| KR | 1020110038208 | 4/2011 |

(Continued)

OTHER PUBLICATIONS

International Searching Authority, "Notification of Transmittal of the International Search Report and the Written Opinion of the International Searching Authority," dated Aug. 16, 2016 in International application No. PCT/US2016/033832.

(Continued)

*Primary Examiner* — Khoi V Le
(74) *Attorney, Agent, or Firm* — Trop, Pruner & Hu, P.C.

(57) ABSTRACT

In one embodiment, a method includes: presenting, in a user interface of an authoring tool, a plurality of levels of abstraction for a network having a plurality of devices; receiving information from a user regarding a subset of the plurality of devices to be provisioned with one or more security keys and an access control policy; automatically provisioning a key schedule for the subset of the plurality of devices in the network based on the user input and a topological context of the network; and automatically provisioning the access control policy for the subset of the (Continued)

plurality of devices in the network based on the user input and the topological context of the network.

24 Claims, 9 Drawing Sheets

(51) Int. Cl.
    *H04W 12/04*     (2009.01)
    *H04L 12/24*     (2006.01)
    *H04W 12/08*     (2009.01)
    *H04W 4/70*     (2018.01)

(52) U.S. Cl.
    CPC ........... *H04W 12/04* (2013.01); *H04L 63/104* (2013.01); *H04L 67/12* (2013.01); *H04W 4/70* (2018.02); *H04W 12/08* (2013.01)

(56) References Cited

FOREIGN PATENT DOCUMENTS

| | | |
|---|---|---|
| WO | 2014130568 A1 | 8/2014 |
| WO | 2015065356 A1 | 5/2015 |

OTHER PUBLICATIONS

Wikipedia, "OSI Model", https://en.wikipedia.org/wiki/OSI_model#Layer_4:_Transport_Layer, Jun. 8, 2015, 7 pages.
Wikipedia, "Key Management", https://en.wikipedia.org/wiki/Key_management, May 19, 2015, 5 pages.
Wikipedia, "Publish—Subscribe Pattern", https://en.wikipedia.org/wiki/Publish%E2%80%93subscribe_pattern, Mar. 18, 2015, 4 pages.
Wikipedia, "Data Distribution Service", https://en.wikipedia.org/wiki/Data_Distribution_Service, May 21, 2015, 5 pages.
Wikipedia, "Kerberos (Protocol)", https://en.wikipedia.org/wiki/Kerberos_%28protocol%29, May 7, 2015, 6 pages.
Stackexchange, "Cryptography", http://crypto.stackexchange.com/questions/3682/how-can-the-diffie-hellman-key-exchange-be-extended-to-three-parties, Aug. 30, 2012, 1 page.
Wikipedia, "XMPP", https://en.wikipedia.org/wiki/XMPP, May 22, 2015, 7 pages.
IBM Mobilefirst, "Pairwise and Group Keys", http://etutorials.org/Networking/802.11+security.+wi-fi+protected+access+and+802.11i/Part+II+The+Design+of+Wi-Fi+Security/Chapter+10.+WPA+and+RSN+Key+Hierarchy/Pairwise+and+Group+Keys/, accessed Sep. 3, 2015, 6 pages.
Hardjono, et al., "Fluffy: Simplified Key Exchange for Constrained Environments", draft-hardjono-ace-fluffy-00, Mar. 23, 2015, 24 pages, Intel Corporation.
openinterconnect.org, "Open Interconnect Consortium: An Overview To Connect Devices Everywhere", http://openinterconnect.org/wp-content/uploads/2015/07/Open-Interconnect-ConsortiumOverview_Final-.pdf, Jul. 2015, 7 pages.
openinterconnect.org, "The Open Interconnect Consortium and IoTivity", http://openinterconnect.org/wp-content/uploads/2015/07/OIC-IoTivity_White-Paper_Final1.pdf, Jul. 2015, 5 pages.
openinterconnect.org, "Cloud-Native Architecture and the Internet of Things", http://openinterconnect.org/wp-content/uploads/2015/07/Cloud-Native-IoT-White-Paper_white_centered_Final.pdf, Jul. 2015, 3 pages.
openinterconnect.org, "Freedom to Implement: OIC and IoTivity", http://openinterconnect.org/wp-content/uploads/2015/07/OIC-IoT-Standards-and-Implementation_White-Paper_Final.pdf, Jul. 2015, 2 pages.
U.S. Appl. No. 14/863,043, filed Sep. 23, 2015, entitled "System, Apparatus and Method for Group Key Distribution on for a Network" by Ned M. Smith.
U.S. Appl. No. 14/864,940, filed Sep. 25, 2015, entitled "System, Apparatus and Method for Secure Network Bridging Using a Rendezvous Service and Multiple Key Distribution Servers" by Ned M. Smith, et al.
U.S. Appl. No. 14/864,957, filed Sep. 25, 2015, entitled "System, Apparatus and Method for Managing Lifecycle of Secure Publish-Subscribe System" by Ned M. Smith, et al.
U.S. Appl. No. 14/865,576, filed Sep. 25, 2015, entitled "System, Apparatus and Method for Secure Coordination of a Rendezvous Point for Distributed Devices Using Entropy Multiplexing" by Ned M. Smith, et al.
U.S. Appl. No. 14/865,191, filed Sep. 25, 2015, entitled "System, Apparatus and Method for Multi-Owner Transfer of Ownership of a Device" by Jesse Walker, et al.
U.S. Appl. No. 14/865,198, filed Sep. 25, 2015, entitled "System, Apparatus and Method for Transferring Ownership of a Device From Manufacturer to User Using an Embedded Resource" by Ned M. Smith, et al.
U.S. Appl. No. 14/856,857, filed Sep. 17, 2015, entitled "System, Apparatus and Method for Access Control List Processing in a Constrained Environment" by Ned M. Smith, et al.
U.S. Appl. No. 14/859,572, filed Sep. 21, 2015, entitled "System, Apparatus and Method for Privacy Preserving Distributed Attestation for Devices" by Ned M. Smith, et al.
U.S. Appl. No. 14/863,496, filed Sep. 24, 2015, entitled "System, Apparatus and Method for Stateful Application of Control Data in a Device" by Nathan Heldt-Sheller, et al.
U.S. Appl. No. 15/045,676, filed Feb. 17, 2016, entitled "System, Apparatus and Method for Security Interoperability Path Analysis in an Internet of Things (IOT) Network" by Ned M. Smith, et al.
U.S. Appl. No. 62/172,962, filed Jun. 9, 2015, entitled "Providing Protected Content in an IoT Network" by Ned M. Smith, et al.
U.S. Appl. No. 14/968,125, filed Dec. 14, 2015, entitled "A Self-Configuring Key Management System for an Internet of Things Network" by Ned M. Smith.
U.S. Appl. No. 14/757,750, filed Dec. 23, 2015, entitled "System, Apparatus and Method for Optimizing Symmetric Key Cache Using Tickets Issued by a Certificate Status Check Service Provider" by Ned M. Smith, et al.
U.S. Appl. No. 14/976,165, filed Dec. 21, 2015, entitled "System, Apparatus and Method for Migrating a Device Having a Platform Group" by Ned M. Smith, et al.
U.S. Appl. No. 14/977,742, filed Dec. 22, 2015, entitled "System, Apparatus and Method for Safety State Management of Internet Things (IoT) Devices " by Ned M. Smith, et al.
Wikipedia, "Tor", https://en.wikipedia.org/wiki/Tor_%28anonymity_network%29 , Jun. 4, 2015, 14 pages.
Networkworld, "A guide to the confusing Internet of Things standards world", http://www.networkworld.com/article/2456421/internet-of-things/a-guide-to-the-confusing-internet-of-things-standards-world.html, Jul. 21, 2014, 7 pages.
Hardjono, T, et al., "Fluffy: Simplified Key Exchange for Constrained Environments," Network Working Group, MIT/Intel Corp., Mar. 23, 2015, 24 Pages.
Hardjono, T, et al., "Fluffy: Simplified Key Exchange for Constrained Environments," Network Working Group, MIT/Intel Corp., Jul. 3, 2015, 46 Pages.
Intel Corportation, "Heterogeneous Distributed Runtime Code that Shares IOT Resources," PCT Application No. PCT/US2015/052387 filed Sep. 25, 2015, Pages.
Intel Corportation, "IOT Service Modeling with Layered Abstraction for Reusability of Applications and Resources," PCT Application No. PCT/US2015/052361 filed on Sep. 25, 2015, 29 Pages.
Intel Corportation, "Facilitating Portable, Reusable, and Sharable Internet of Things (IoT)-Based Services and Resources," U.S. Appl. No. 14/864,757, filed Sep. 24, 2015, 62 Pages.
Wikipedia, "Trusted computing base," https://en.wikipedia.org/wiki/Trusted_computing_base, 4 Pages.
Mehdi, et al., "CupCarbon: A Multi-Agent and Discrete Event Wireless Sensor Network Design and Simulation Tool", Proceedings of the Seventh International Conference on Simulation Tools and Techniques, Mar. 31, 2014, pages.
Dhoutaut, et. al, "Efficient Simulation of Distributed Sensing and Control Environments", 2013 IEEE International Conference on Green Computing and Communications and IEEE Internet of Things and IEEE Cyber, Physical and Social Computing, IEEE, Aug. 20, 2013, pp. 452-459.

(56) References Cited

OTHER PUBLICATIONS

Olivereau, et al., "Trustworthy Wireless Industrial Sensor Networks", TWISNet, Apr. 12, 2013, 49 pages.
European Patent Office, Extended Search Report dated Jan. 3, 2019, in European Patent Application No. 16808013.3, 10 pages.

* cited by examiner

US 10,419,438 B2

SYSTEM, APPARATUS AND METHOD FOR AUTO-OPTIMIZATION OF ACCESS CONTROL POLICY AND KEY MANAGEMENT IN A NETWORK AUTHORING TOOL

This application claims priority to U.S. Provisional Patent Application No. 62/172,916 filed on Jun. 9, 2015 and entitled "SYSTEM, APPARATUS AND METHOD FOR AUTO-OPTIMIZATION OF ACCESS CONTROL POLICY AND KEY MANAGEMENT IN A NETWORK AUTHORING TOOL", the content of which is hereby incorporated by reference.

BACKGROUND

Creating an Internet of Things (IoT or IOT) network can be a complex task, particularly for a layperson. An authoring tool may be used to create a network, but complexity remains. Still further, when some complexity is hidden security provisioning (e.g., security keys) can be done improperly.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner.

Figure 1:
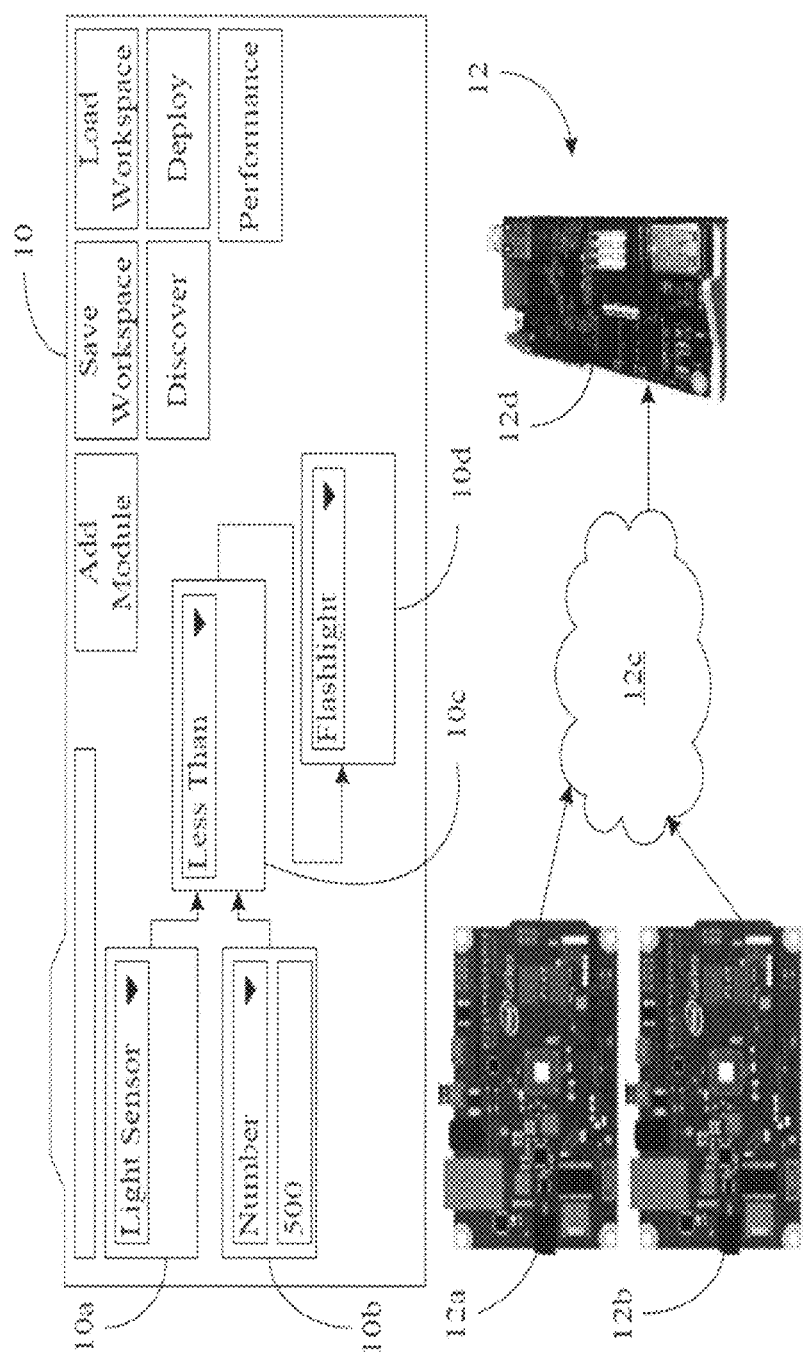
FIG. 1 is an illustration of a frontend interface and IoT architecture in an embodiment.

Turning now to FIG. 1, a frontend interface 10 (10a-10d) is shown, wherein the frontend interface 10 may be used by a developer to create and deploy an application such as, for example, an IoT application. The frontend interface 10 may therefore present a virtualization (also referred to as an abstraction) of a physical IOT architecture 12 (12a-12d) that may be used to support operation of the IOT application designed using the frontend interface 10. The IOT architecture 12 may generally include devices such as, for example, IOT devices having physical 30 resources that support operation of the IOT application being deployed via the frontend interface 10. Each IOT device in the architecture 12 may function as a "coordinator" (e.g., master) with regard to some IOT applications and function solely as a "contributor" (e.g., slave) with regard to other IOT applications. Thus, the frontend interface 10 may run on a coordinator IOT device that deploys the IOT application in question to other contributor IOT devices. In the illustrated example, both a light sensing resource abstraction 10a and a storage resource abstraction 10b provide inputs to a compute resource abstraction 10c. The compute resource abstraction 10c may perform a computation (e.g., determine whether the light sensing input is less than the value 500) and send the result of the computation to a flashlight resource abstraction 10d (e.g., turning on a flashlight if the light sensing input is less than the value 500). One or more resources in the illustrated IOT architecture 12 may generally correspond to the resource abstractions in the frontend interface 10. For example, a light sensor circuit 12a corresponds 10 to the light sensing resource abstraction 10a, a storage circuit 12b corresponds to the storage resource abstraction 10b, a cloud computing infrastructure 12c corresponds to the compute resource abstraction 10c, and a flashlight circuit 12d corresponds to the flashlight resource abstraction 10d, in the illustrated example. See also, e.g., PCT Patent Application No. PCT/US2015/052387, assigned to Intel Corp. of Santa Clara, Calif., USA.

Of particular note is that the frontend interface 10 may enable the IOT application to be developed without the use of identifiers, addresses (e.g., media access control/MAC addresses), etc., of the contributors. The coordinator IOT device (e.g., gateway, cloud manager) may subsequently determine the bindings (e.g., assignments) between resource requirements and the contributors, and conduct the deployment. As will be discussed in greater detail, the coordinator IOT device may partition the IOT application into a plurality of atomic nodes and deploy configuration information for the atomic nodes to the contributors. The configuration information may be the minimal set of settings that enable the contributors to generate runtime code. Thus, once the configuration information is deployed, the contributors may execute their respective portion of the IOT application and communicate with one another to accomplish the tasks of the IOT application.

Figure 2A:
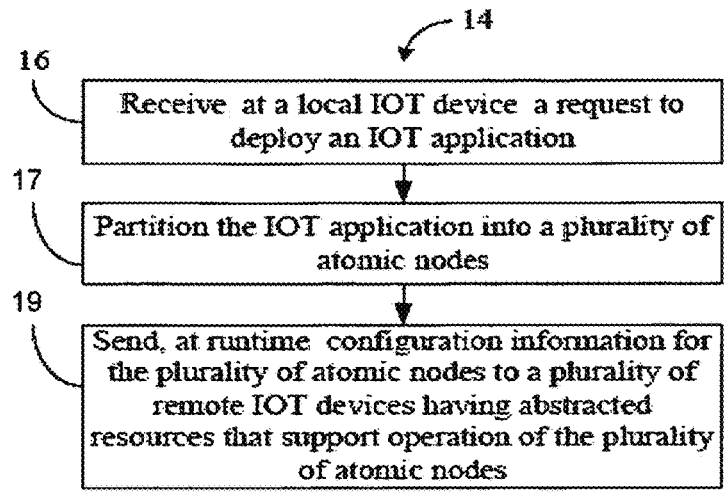
FIG. 2A is a flowchart of a method of operating a coordinator apparatus in an embodiment.

FIG. 2A shows a method 14 of operating a coordinator apparatus of an IOT device. The method 14 may be implemented as one or more modules in a set of logic instructions stored in a non-transitory machine- or computer-readable storage medium 30 such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 14 may be written in any combination of one or more programming languages, including an object oriented programming language such as JAVA, SMALLTALK, C++ or the like and conventional procedural programming languages, such as the "C" programming language or similar programming languages.

Illustrated processing block 16 provides for receiving, at a local IOT device, a request to deploy an IOT application. The request may be received via a frontend interface such as, for example, the frontend interface 10 (FIG. 1), already discussed. The IOT application may be partitioned at block 17 into a plurality of atomic nodes. The atomic nodes may be classified as, for example, source nodes that generate data, sink nodes that consume data and/or operator nodes that consume data and generate data.

Block 19 may send, at runtime, configuration information for the plurality of atomic nodes to a plurality of remote IOT devices having abstracted resources that support operation of the plurality of atomic nodes. As already noted, the configuration information may be the minimal set of settings that enable the contributors to generate runtime code. Thus, the configuration information, which may be sent via a device independent messaging protocol, may include a class identifier and one or more parameters associated with each atomic node. In one example, the class identifiers include one or more of a source node class, a sink node class or an operator class. Accordingly, block 19 may also provide for instructing each of the plurality of remote IOT devices to conduct a runtime generation of only a subset of the first plurality of atomic nodes. There may also be one or more local abstracted resources that can support operation of a portion of the IOT application. In such a case, block 19 may also bind one or more local abstracted resources to a subset of the plurality of atomic nodes.

Figure 2B:
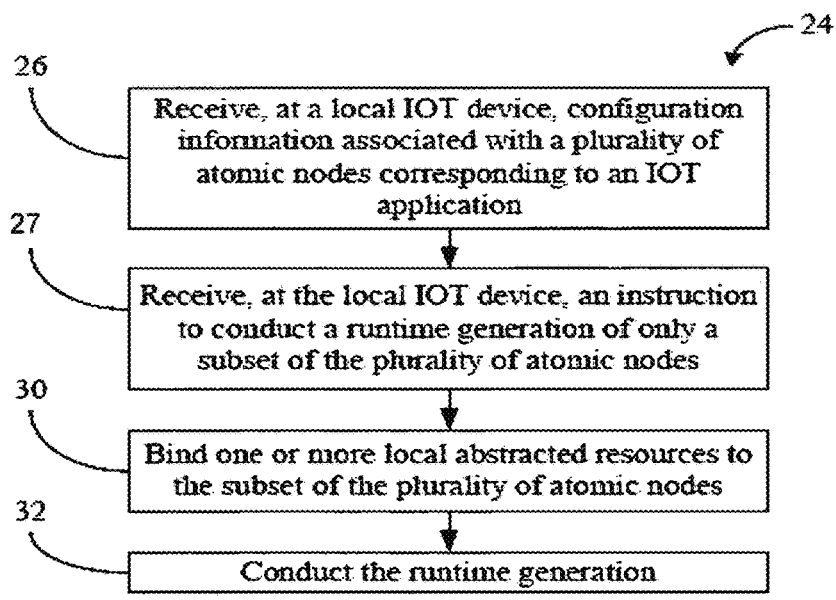
FIG. 2B is a flowchart of a method of operating an IoT device in an embodiment.

FIG. 2B shows a method of operating an IOT device that is functioning as a contributor or a profile adaptor (described in greater detail below). The method 24 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 26 provides for receiving, at the IOT device, configuration information associated with a plurality of atomic nodes corresponding to an IOT application. Additionally, block 27 may receive, at the IOT device, an instruction to conduct a runtime generation of only a subset of the plurality of atomic nodes. One or more local abstracted resources may be bound to the subset of the plurality of atomic nodes at block 30. Additionally, illustrated block 32 conducts the runtime generation.

Thus, embodiments like that of FIG. 1 may be used in a network authoring tool in which a user interface hides much of the complexity involved in setting up an IoT network by a lay person. The tool may present an appropriate level of abstraction while remaining efficacious.

Figure 3:
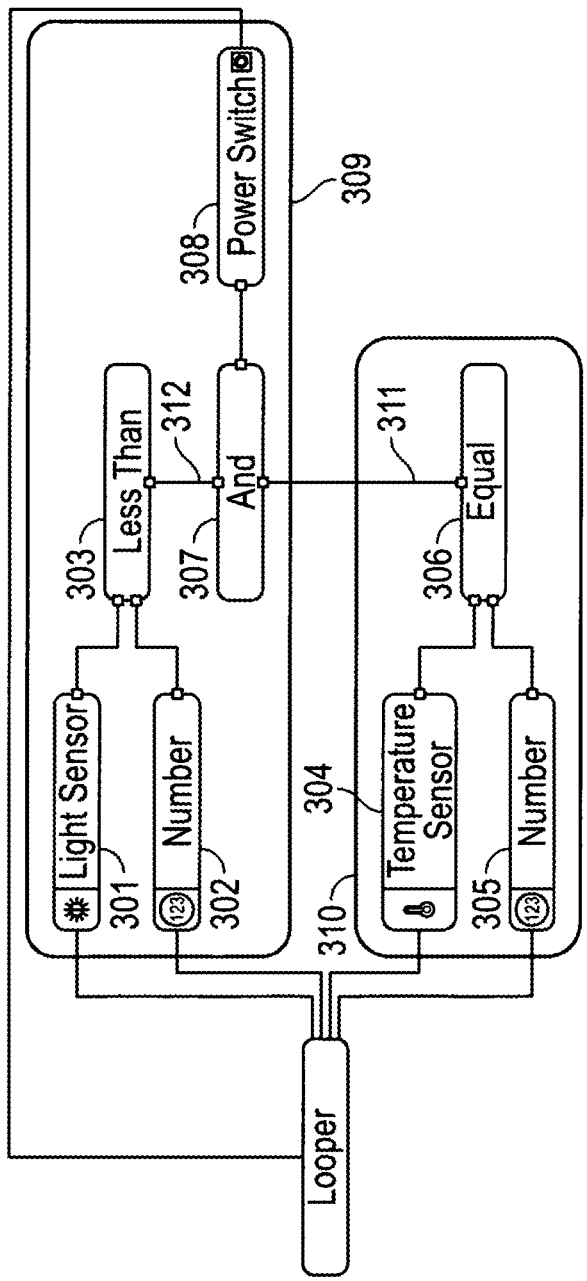
FIG. 3 is an illustration of a user interface abstraction of an authoring tool.

However, FIG. 3 shows how such an abstracted depiction does not show where an IoT logic operation is actually evaluated. Evaluation is distributed across physical nodes. But the precise schedule describing how work is distributed is hidden from the tool user. For example, if arranged similarly to that of FIG. 1, the user may know of elements 301 (sensing resource abstraction), 302 (storage resource abreaction), 303 (compute resource abstraction), 304 (sensing resource abstraction), 305 (storage resource abreaction), 306 (compute resource abstraction), 308 (power switch abstraction) but may not necessarily know where element 307 (compute resource abstraction) is to be performed. For example, the user may not know if element 307 is to be performed on a device (e.g., system-on-chip (SOC)) including sensor 301 or on a different node such as a node including sensor 304. In the particular case of FIG. 3, the evaluation at element 307 is conducted within Node-A, which includes sensor 301 and power switch 308. The user may not realize the evaluation at element 307 is not conducted on the node that includes sensor 304. In other words, the user may not appreciate the delineated nodal boundaries 309 (for Node-A), 310 (for Node-B). This may have a serious effect on security considering, as Node-A and Node-B are shown in FIG. 3, the configuration may require an access control list (ACL) to govern communications between the two nodes and/or security keys may need to be provisioned between the two nodes to encrypt communications at path 311. And if Node-A were for some reason to lose the ability to handle the evaluation at element 307, a dynamic system may then move the evaluation at element 307 from Node-A to Node-B, thus requiring an ACL and keys for path 312 instead of path 311.

Embodiments, however, identify (and sometimes illustrate) the boundaries 309, 310 of nodes to a user. More generally, embodiments help automate configuring ACLs and provisioning security key administration by tapping into a network topological context (e.g., see FIG. 4). Embodiments provide the ability for an IoT authoring tool (such as FIG. 1) and IoT network simulation tool to detect security relevant boundary crossings (such as path 311 in FIG. 3) and to generate an ACL structure that permits the boundary crossing in an instantiated IoT network. Embodiments also provide the ability to simulate IoT devices in a user's IoT network to visualize operational eventualities and to allow a try-and-buy user experience that may include vendor promotions.

Embodiments preserve an ability to abstract the IoT network topology from the user while using an inference method internally to develop an ACL and key management scheme that is secure and optimized according to a method for determining distributed evaluation of an IoT system execution plan. Thus, while some embodiments focus on provisioning credentials other embodiments are not so limited. For example, various embodiments leverage analysis of a deployment topology (e.g., see FIG. 4) to illuminate the way different nodes of an IoT system may best operate with one another. For example, users may add a node into a network from vendor A and then evaluate performance of the newly arranged network via simulations. The user may then substitute the node from vendor A with a node from vendor B and then evaluate performance of the newly arranged network via simulations. If the user purchases the node from vendor B, the operator of the simulator may receive compensation from vendor B. In other embodiments, the operator of the simulator may receive compensation merely for providing a simulation based on the simulated node from vendor B. Thus, embodiments may be broader than provisioning keys.

As already noted, the resources of the IOT devices may be abstracted (described generally to exclude device identifiers) until runtime. Such an approach may facilitate development by determining which device identifiers to be used at runtime. More particularly, resource abstraction may enhance ease-of-use by enabling the development of IOT applications without hardcoded identifiers (e.g., increasing portability of IOT applications). Resource abstraction may also expedite the development of IOT applications by disregarding radio protocols and network topologies at the requirement specification stage. In one example, the resource abstractions may include abstractions such as, for example, sensing (e.g., light, presence, temperature, etc.), actuation (e.g., light, sunshade, air conditioning, etc.), power (e.g., battery-powered, landline powered, etc.), storage (e.g., secure digital/SD, solid state disk/SSD, cloud storage, etc.), computing (e.g., microcontroller unit/MCU, central processing unit/CPU, graphics processing unit/GPU, cloud, etc.), communication (e.g., Bluetooth Low Energy/BLE, ZIG-BEE, WiFi, Ethernet, etc.), and so forth. These abstractions may help illuminate security issues (areas of security exposure to certain nodes, such as an unencrypted input/output to a node) as addressed by embodiments discussed herein.

In one example, the coordinator may discover sensing, actuation and communication resources via the device independent message protocol, and protocol adaptation may be used to obtain the power, storage and computing abstractions from the operating system (OS).

Figure 4:
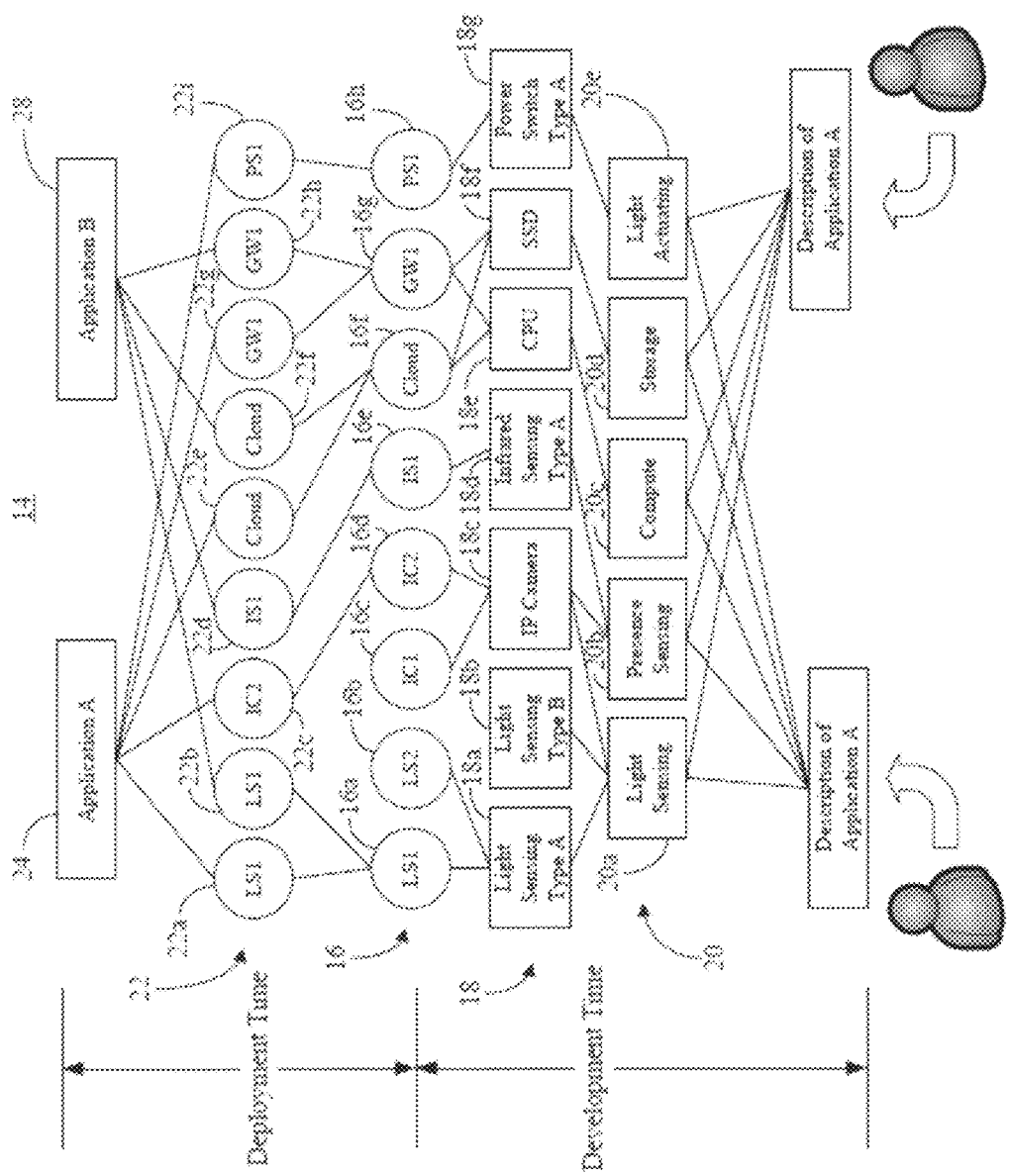
FIG. 4 is an illustration of an IOT service model (also referred to herein as a topology model, contextual model, network topological context, and the like) having layered abstraction in an embodiment.

FIG. 4 shows an IOT service model/network topological model 14 in which a plurality of IOT devices 16 (16a-16h, e.g., at a physical layer) have a resource abstraction layer 18 (18a-18g), a capability abstraction layer 20 (20a-20e) and a runtime abstraction layer 22 (22a-22i). The illustrated capability abstraction layer 20 includes categories such as, for example, a light sensing option 20a, a presence sensing option 20b, a compute option 20c, a storage option 20d, a light actuation option 20e, etc., wherein the capability abstraction layer 20 may reference basic functional abilities without specifying the types of IOT devices 16 that provide the referenced abilities (e.g. resulting in a layer of capability abstraction) or specifying the particular IOT devices 16 that provide the referenced abilities (e.g., resulting in a layer of resource abstraction).

The plurality of IOT devices 16 may include, for example, light sensors (generally "LS") such as a first light sensor 16a (LS1) and a second 10 light sensor 16b (LS2), IP cameras (generally "IC") such as a first IP camera 16c (IC1) and a second IP camera 16d (IC2), infrared sensors (generally "IS") such as a first infrared sensor 16e (IS1), cloud computing nodes (generally "Cloud") such as a first cloud node 16f, gateways (generally "GW") such as a first gateway 16g (GW1), power switches (generally "PS") such as a first power switch 16h (PS1), and so forth. Additionally, the resource abstraction layer 18 may include, for example, a "Type A" light sensing resource abstraction 18a (e.g., ZIG-BEE HA/home automation light sensing), a "Type B" light sensing resource abstraction 18b (e.g., BLUETOOTH smart light sensing), an IP camera resource abstraction 18c, a "Type A" infrared sensing resource abstraction 18d (e.g., ZIGBEE HA infrared sensing), a CPU resource abstraction 18e, an SSD resource abstraction 18f, a "Type A" power switching resource abstraction 18g (e.g., ZIGBEE HA power switching), and so forth. See also, e.g., PCT Patent Application No. PCT/US2015/052361, assigned to Intel Corp. of Santa Clara, Calif., USA.

In general, a request to configure an IOT application such as, for example, a first application 24 ("Application A") for operation in a physical environment including the plurality of IOT devices 16 may be entered by a user at development time in response to a prompt such as, for example, the prompt 10 (FIG. 1). The request may extend through the capability abstraction layer 20 and the resource abstraction layer 18 to the physical layer containing the IOT devices 16. More particularly, the request might include, for example, the light sensing capability abstraction 20a, wherein the Type A light sensing resource abstraction 18a may be selected from a plurality of resource abstractions based on the light sensing capability abstraction 20a. In the illustrated example, the Type A light sensing resource abstraction 18a may be provided by either the first light sensor 16a or the second light sensor 16b in the physical environment. Accordingly, the first application 24 may be bound (e.g., associated, linked) with the first light sensor 16a for the purposes of light sensing.

Of particular note is that if the first light sensor 16a has a status change (e.g., malfunctions, is remotely upgraded, or is in any way substantially modified so that it can no longer perform its role as described by its capability abstraction), the first application 24 may be automatically bound with any other IOT device 16 having the light sensing capability without requiring the first application 24 to be re-programmed with new embedded IDs, MAC addresses, etc., that are unique to the new IOT device 16. Thus, the second light sensor 16b might be readily substituted for the first light sensor 16a, in the illustrated example. Indeed, even another type of light sensor that corresponds to the Type B light sensing resource abstraction 18b and has different connectivity (e.g., BLE/BLUETOOTH low energy) may be substituted 10 for the first light sensor 16a. Moreover, different types of IOT devices having overlapping capabilities may replace one another in a manner that is transparent to the user. For example, if the first cloud node 16f is used by the first application 24 for compute capability, a failure in the first cloud node 16f may cause the first gateway 16g to be automatically bound with the compute option 20c of the capability abstraction layer 20.

Additionally, a first runtime abstraction 22a (e.g., virtual instance) may be selected and/or invoked from a plurality of runtime abstractions at the runtime abstraction layer 22, wherein the first runtime abstraction 22a may be dedicated to the first application 24. Accordingly, data generated by the first light sensor 16a may be sent at deployment time to the first application 24 via the first runtime abstraction 22a. By contrast, a second runtime abstraction 22b may be selected and/or invoked from the plurality of runtime abstractions, wherein the second runtime abstraction 22b may be dedicated to a second application 28 ("Application B"). Thus, data generated by the first light sensor 16a may also be sent to the second application 28 via the second runtime abstraction 22b. The illustrated runtime abstraction layer 22 may therefore improve resource efficiency by enabling the IOT devices 16 to be reused/shared across multiple applications. Runtime abstraction may also obviate multi-stakeholder concerns over resource isolation.

In one example, the runtime abstraction layer 22 is implemented via multithreading. For example, a JAVA servlet may package virtual instances of the IOT devices 16 into different threads, which a) interact with corresponding preceding and successive resources for an application, and b) interact with the underlying physical resource through resource abstraction. Virtual instance packaging may also be achieved through containers such as, for example, DOCKER containers.

Regarding abstractions, the atomic software components of an IOT application may be classified into categories such as, for example, the following three categories.

1. Source nodes that generate data. A source node may not take input from other nodes and generate one data stream, which can be sent to multiple succeeding nodes. In one example, source nodes use application programming interfaces (APIs) such as, for example, GPIO (General Purpose Input/Output), RESTful (Representational State Transfer), etc., to obtain the data and then send the data to the successor(s) of the source nodes.

2. Sink nodes that consume data. A sink node may not have a successor and may accept as input an arbitrary number of nodes. Sink nodes may also use APIs such as, for example, GPIO, RESTful, etc., to trigger control of hardware or software.

3. Operator nodes that consume data and generate data. An operator node may accept an arbitrary number of inputs and generate one output stream, which may be sent to multiple succeeding nodes. Operator nodes may include mathematical and/or analytical functions such as, for example, thresholding (e.g., less than), average, and so forth. Other atomic node classifications may also be used.

Figure 5:
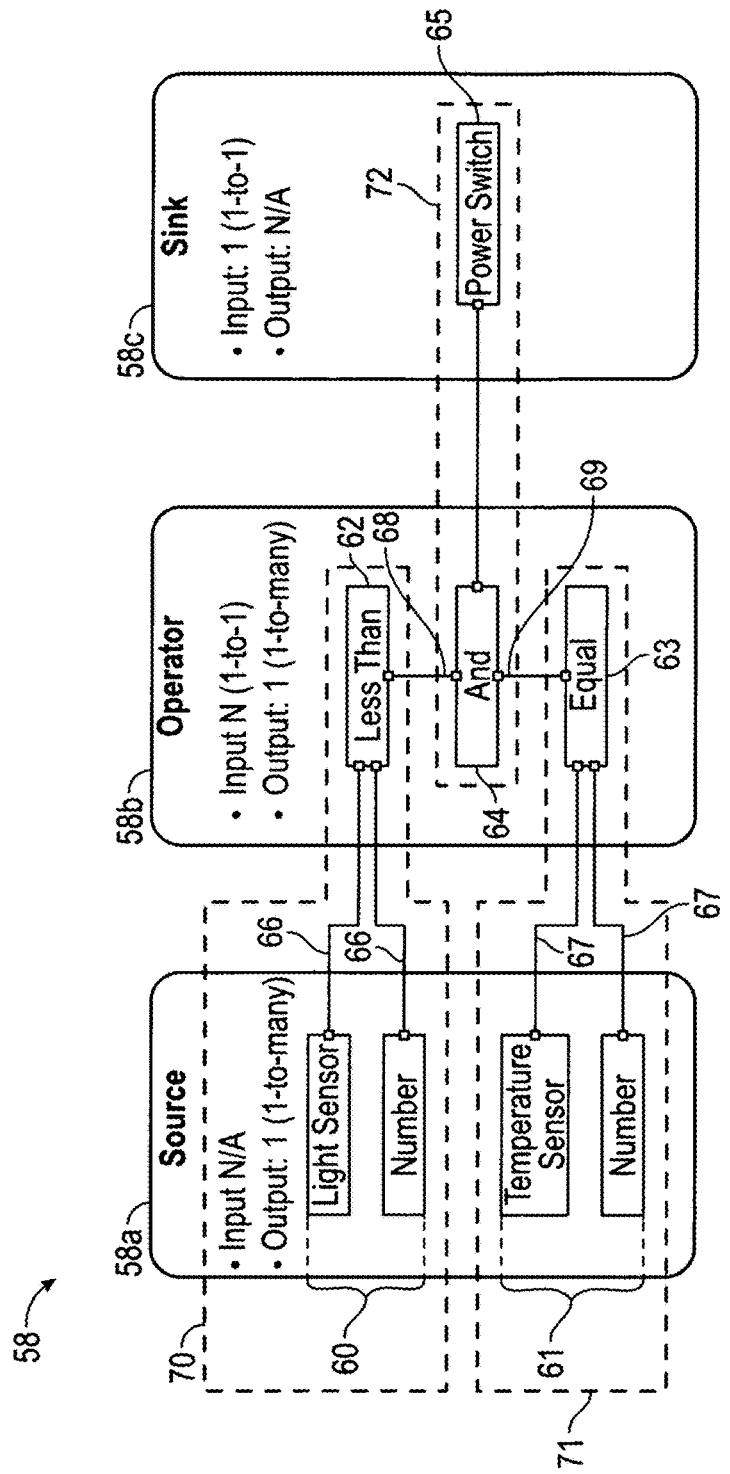
FIG. 5 is a block diagram of an example of a plurality of nodes and boundaries in an embodiment.

FIG. 5 shows a plurality of atomic nodes 58 (58a-58c). In the illustration a source node 58a generates a light sensor output and associated number, as well as a temperature sensor output and associated number. An operator node 58b may apply a first function (e.g., less than) to the light sensor output and associated number, wherein the first function has an output that feeds into an AND function. Similarly, the operator node 58b may apply a second function (e.g., equal) to the temperature sensor output and associated number, wherein the second function also has an output that feeds into the AND function. The illustrated AND function is coupled to an input of a sink node 58c, which includes a power switch actuator.

FIG. 5 provides an illustration of a security configuration inference layer showing boundary context information and message flow input/output information being used to generate a key schedule and ACL policy, in accordance with an embodiment. For example, based on an IoT service model (e.g., FIG. 4) it will be known that element 60 forms a first logical boundary 70 that extends to include element 62. Thus, there is no boundary crossing at points 66. Further based on the IoT service model it will be known that element 61 forms a second logical boundary 71 that extends to include element 63. Thus, there is no boundary crossing at point 67. However, elements 64 and 65 form a third boundary 72. As a result, boundary crossings occur at points 68 (boundary crossing from boundary 1 output into boundary 3 input) and 69 (boundary crossing from boundary 2 output into boundary 3 input). Therefore, keys and ACLs may be provisioned to managed communications at points 68, 69. These boundary crossings are "security attack points" where an input/output to a node or similarly situated nodes may serve as an avenue for malware and the like that inhibits security.

Figure 6:
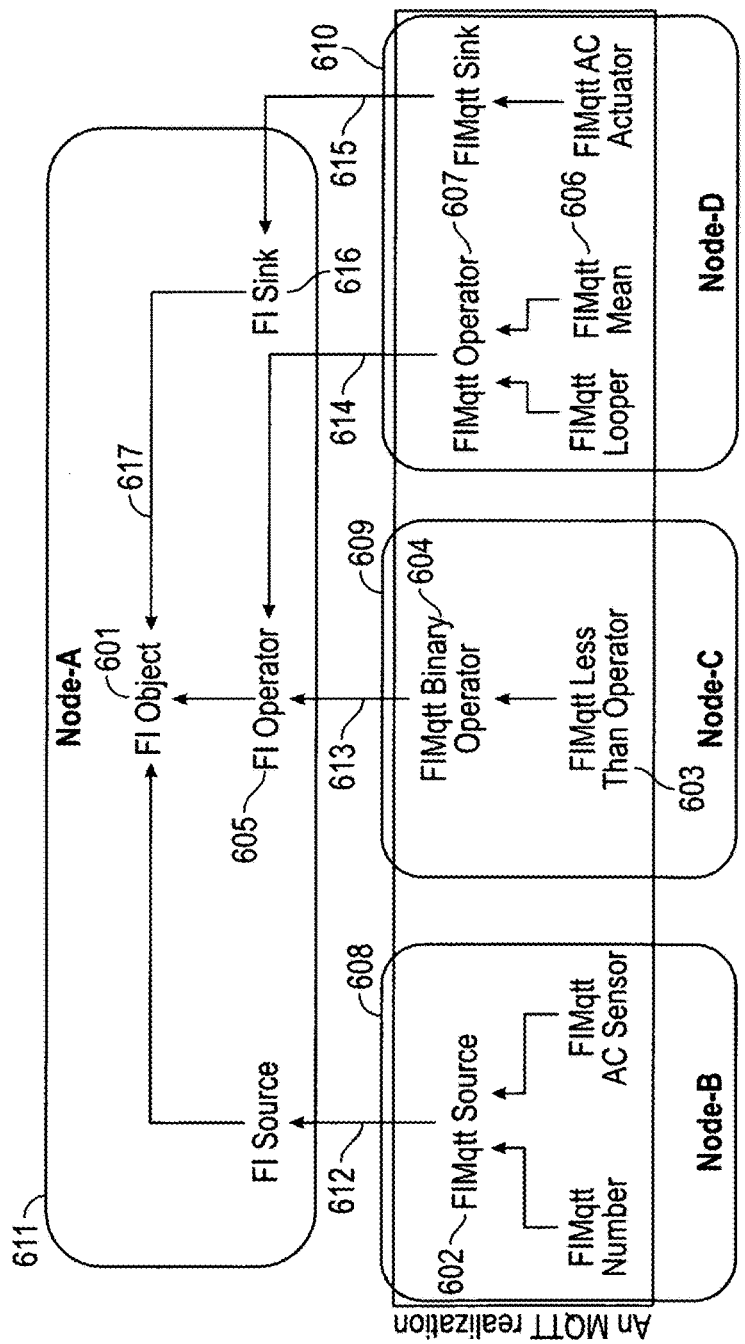
FIG. 6 is an illustration of a logical operation construct in an embodiment.

FIG. 6 provides an example regarding how an embodiment includes a system operation authoring tool that uses an IoT service model to map a logical execution plan to a distributed execution plan. As seen, a logical operation is displayed as an object (an object of authoring tool, such as an object that could communicate with nodes 58a, 58b, 58c of FIG. 5) decomposed into a hierarchy of logical operations (e.g., 602, 603, 604, 605, 606, 607) involving, for example, a message queuing telemetry transport (MQTT) distributed publish-subscribe system. However, the logical model hides a physical deployment model, here represented with Nodes A-D and their boundaries (608, 609, 610, 611). A physical deployment model informs the security configuration in terms of identifying which nodes may interact with which other nodes, and where boundary crossings 612, 613, 614, 615 are (which may need to be managed by ACLs and keys). Simulations may be run with differing execution plans that account for the possibility of rearranging nodes or boundaries such that, for example, Node-D is extended to include FiSink 616, which would then move boundary crossing from point 615 to point 617. Interaction depends on shared credentials for authenticating and protecting communications. The logical model also informs the access model describing the data structures and operations that are intended to be performed.

Please note that, for example, Node-A has boundary 608. Boundary 608 may pertain to a physical node (e.g., sensor) and/or a logical node (e.g., software implemented Trusted Platform Module, a sandboxed process, and the like).

Figure 7:
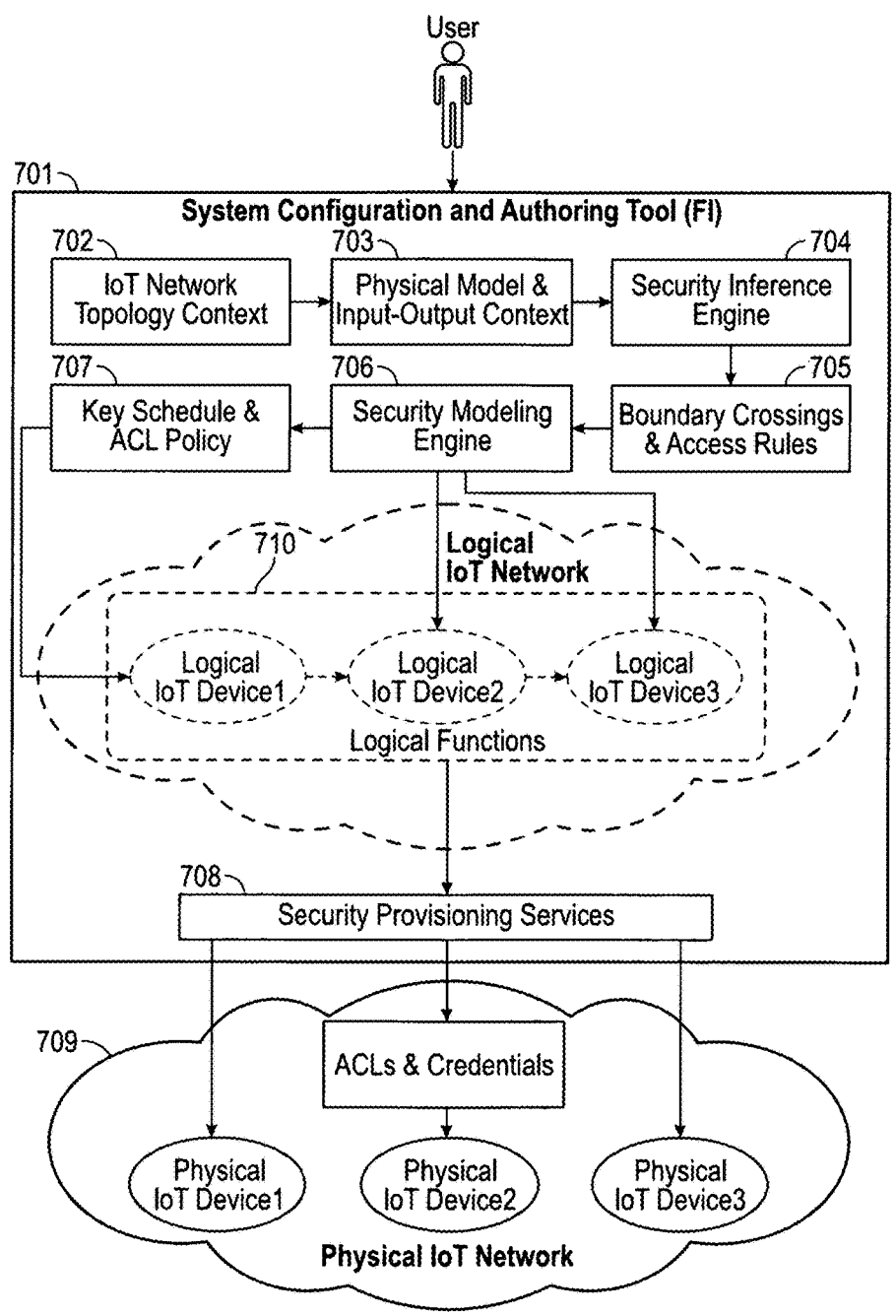
FIG. 7 is a block diagram of a physical-to-logical mapping of devices of a network using an authoring tool in an embodiment.

FIG. 7 is a block diagram of a physical-to-logical mapping of devices of a network using an authoring tool in accordance with an embodiment. Embodiments may use a physical-to-logical mapping method as shown in FIG. 7 to inform a security inference engine (also referred to as module) of an authoring tool which (physical) devices are to use device-to-device keys. The mapping method may further be used to inform an access control system which ACL policies are to be used for a given operation (e.g., an operation on Node-B to be completed using Node-A, and the like).

More specifically, process 701 includes providing IoT network topology context/model (block 702). An example of such a context is FIG. 4. Block 703 includes the physical model and input-output context, which is derived from the IoT network topology context. Block 703 is a representation of logic contained in block 702. It could be a serialization such as an XML or JSON or CBOR formatting of data structures realized in memory in block 702. The security engine (block 704) then uses the above contextual information to determine boundary crossings and access rules (e.g., see points 68, 69 in FIG. 5). A security modeling engine 706 then uses the determined boundary crossings to generate key schedule and ACL policies (block 707) for logical IoT devices 1, 2, 3 (element 710). This may generate output to a security provisioning service 708 (e.g., see access management services and the like discussed in the Open Interconnect Consortium (OIC) IoTivity or Allseen Alliance framework specifications). This leads to actual provisioning of physical devices with ACLs and credentials (e.g., keys) (block 709).

Consequently, the user of the tool is not required to author directly the access control rules or key provisioning steps, while security tenets are upheld in terms of intended system operation. A design tool in accordance with an embodiment provides a method for inferring security management objectives from a network topology context. A security objective informs a security modeling engine of the design tool (which is in communication with a security inference engine and, via a logical network, a security provisioning service) that allows simulation of access control rules and data exchange using expected data protection techniques (e.g., if DTLS is supported by network layers, the simulation can show this) and the instances of keys used to protect the links.

Simulation offers an additional opportunity for automated optimization for performance, safety, utility as well as security. For example, simulation execution may be used to determine if a classified device is reachable by an unclassified path. Further, a what-if scenario can be employed to understand what devices may be vulnerable/or out of service while an emergency response action re-keys compromised devices. Additionally, a simulation tool provides a platform for advertisers to introduce new products to potential customers, allowing them to try them out in simulation first before buying them for physical deployment.

Once the user is satisfied with the simulation, security provisioning services can be invoked that instantiate the ACLs and credentials into the physical IoT network. Thus embodiments may be used with a physical IoT network or a simulated IoT network or both, using an IoT system configuration and authoring tool in accordance with an embodiment. In some cases, the IoT network may be in accordance with an IoT framework such as an OIC IoTivity or Allseen Alliance framework having primitives for provisioning and configuring ACLs and pair-wise symmetric keys (such as Fluffy: Simplified Key Exchange for Constrained Environments, draft-hardjono-ace-fluffy-00 (draft IETF Specification Mar. 23, 2015)) or asymmetric keys with an ability to generate temporal session keys such as TLS/DTLS.

Returning now to FIG. 4, shown is a block diagram of a multi-layer abstraction model of an authoring tool in accordance with an embodiment. As seen, the IoT system configuration and authoring tool has a 5 layer abstraction model, where contextual inputs including physical or logical boundaries (such as a process isolation boundary or a sandbox container) are known to the tool. Specifically, FIG. 4 shows 5 layers of abstraction that map physical IoT devices to a logical IoT network that enables an easy to use 'drag-and-drop' programming model. Included in the layering is a key management and access control configuration mapping function that infers which physical devices (nodes) are to be provisioned with which keys and which ACLs. If the tool user changes the layout or function of the top level abstraction, the appropriate changes to the security configuration can be inferred using context from the surrounding layers. Understand that greater or fewer layers of abstraction may be present in other embodiments.

An embodiment is based on network topology context knowledge to identify boundary crossings, to infer an appropriate key schedule (which keys belong to which boundaries) and to infer an ACL policy (which outputs from a respective boundary are consumed by which inputs to a particular boundary). The "devices" layer 16 may describe the physical instance or 'platform' that hosts device logic, or it may contain a device container/sandbox instance that hosts device logic, or it may reference a secure element (SE), hardware security module (HSM), and/or trusted execution environment (TEE) technology used to protect device assets, or so forth. The devices layer 16 may further reference a network security module that implements a secure communications channel or messaging session technology such as TLS, DTLS, IPSEC etc. to further inform the security system regarding boundary crossings. As such, the devices layer 16 defines security boundaries, and ACLs and keys may be auto-configured in the context of abstraction layers.

Embodiments thus provide an IoT authoring tool to implement multi-layer network topology abstractions containing, among other things, inputs to a security inference engine which infers a security model for protecting communications paths over boundary crossings with cryptographic means. Further, embodiments of a tool may be configured to infer an access control model based on identified input-output flows of IoT information, where the security inference may be applied to a simulation of an IoT network showing the inferred security properties in play. Additionally, the simulation may be provide what-if scenarios that suggest improvements to security, safety, performance and further suggest or accommodate vendors and advertisers that allow their products' simulation to be incorporated in a try-before-you-buy model. Still further, a simulation network in accordance with an embodiment may be used to inform a security provisioning service to physically instantiate physical devices with ACL policies and credentials for enforcing communication security automatically. Thus, embodiments provide an IoT authoring tool to automate, simulate and auto-configure security in the form of access policies and key management.

Figure 8:
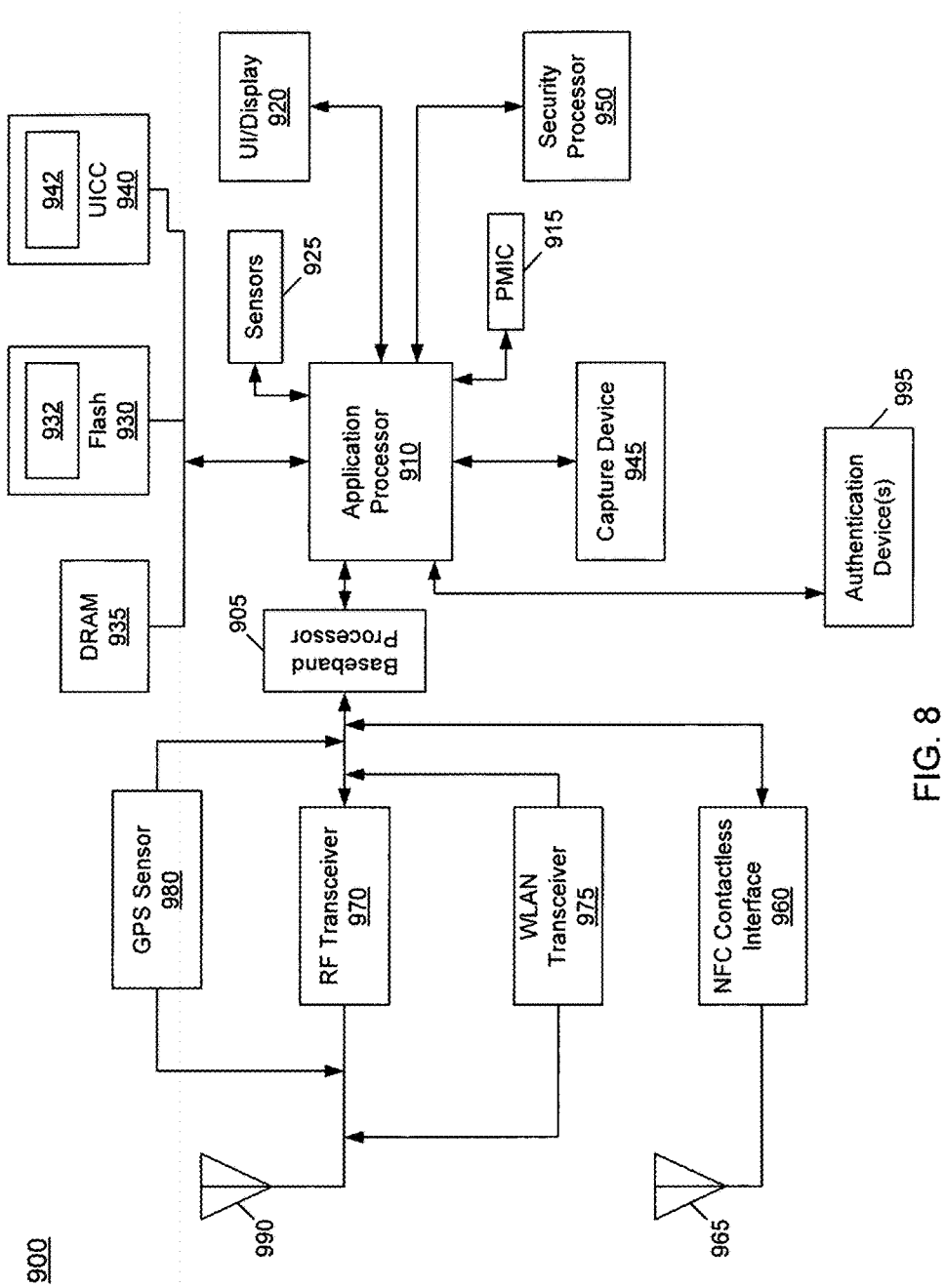
FIG. 8 is a block diagram of a system with which embodiments can be used.

Referring now to FIG. 8, shown is a block diagram of an example system with which embodiments can be used. As seen, system 900 may be a smartphone or other wireless communicator or any other IoT device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices that can record video and/or still images.

Still referring to FIG. 8, a universal integrated circuit card (UICC) 940 comprises a subscriber identity module, which in some embodiments includes a secure storage 942 to store secure user information. System 900 may further include a security processor 950 that may couple to application processor 910. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 8, understand that in some implementations one antenna or a different set of antennae may be provided to enable various wireless functionalities.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 9:
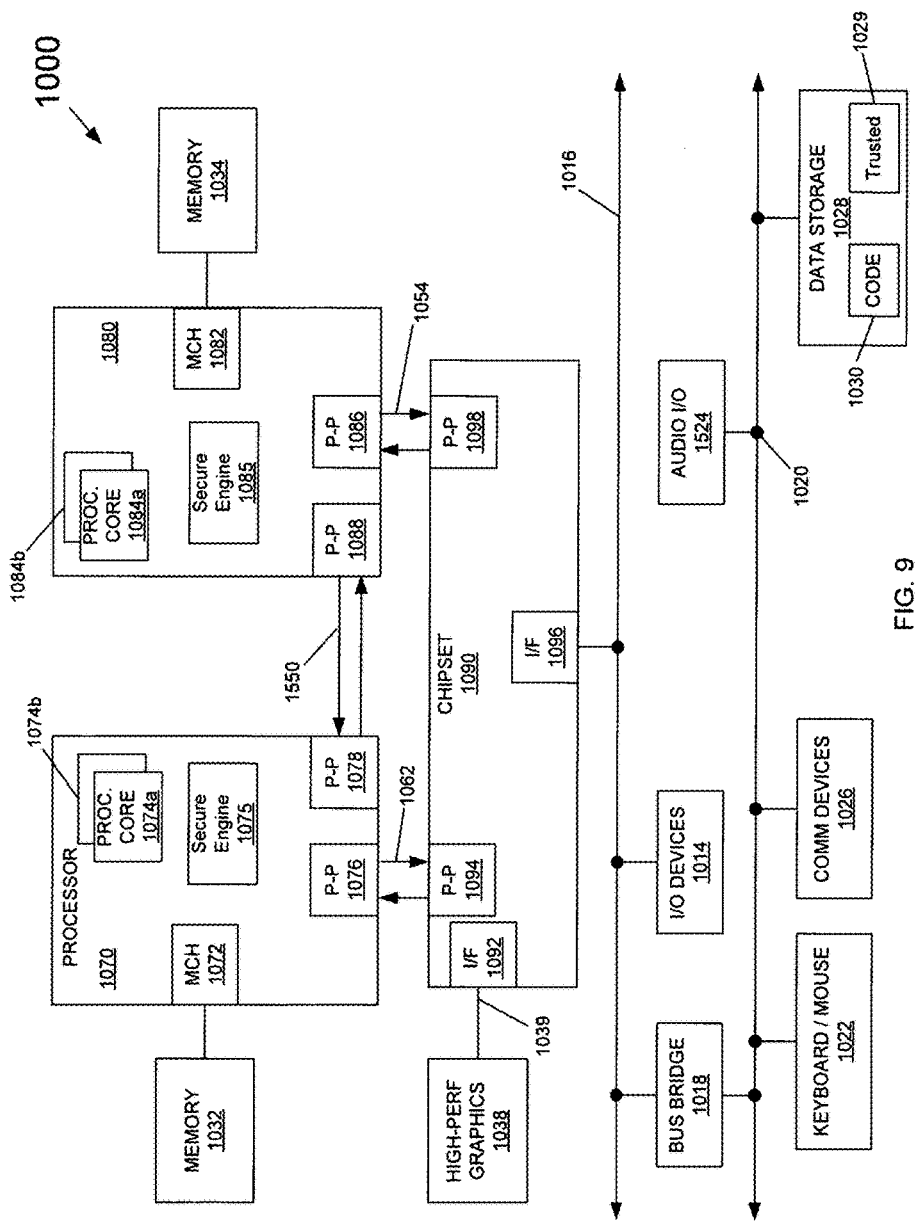
FIG. 9 is a block diagram of a system in accordance with another embodiment.

Referring now to FIG. 9, shown is a block diagram of a system in accordance with another embodiment of the present invention. As shown in FIG. 9, multiprocessor system 1000 is a point-to-point interconnect system such as a server system, and includes a first processor 1070 and a second processor 1080 coupled via a point-to-point interconnect 1050. As shown in FIG. 9, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform security operations such as attestations, IoT network onboarding or so forth.

Still referring to FIG. 9, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 9, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 9, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 9, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following examples pertain to further embodiments.

Example 1 includes at least one computer readable storage medium comprising instructions that when executed enable a system to: access an internet-of-things (IoT) network topology model that is partitioned into first and second nodes; determine a first execution plan that, when executed, couples the first and second nodes together to execute a first task; determine the first node is within a first logical boundary and the second node is within a second logical boundary; determine a first boundary crossing exists where the first execution plan, when executed, will cross from the first logical boundary into the second logical boundary; and in response to determining the first boundary crossing, determine a first credential and a first access control list (ACL) are needed for communications across the first boundary crossing; wherein (a) the first node is an abstraction of at least one of a first physical node included in the IoT network and a first logical node corresponding to the first physical node; and (b) the second node is an abstraction of at least one of a second physical node included in the IoT network and a second logical node corresponding to the second physical node.

Another version of Example 1 includes as least one computer readable storage medium comprising instructions that when executed enable a system to: access an internet-of-things (IoT) network topology model that is partitioned into first and second nodes; determine a first execution plan that, when executed, couples the first and second nodes together to execute a first task; determine the first node is within a first logical boundary and the second node is within a second logical boundary; determine a first boundary crossing exists where the first execution plan, when executed, will cross from the first logical boundary into the second logical boundary; and in response to determining the first boundary crossing, determine a first credential and a first access control list (ACL) are needed for communications across the first boundary crossing;

wherein (a) the first node is an abstraction of at least one of
    a first physical node included in the IoT network and a first logical node corresponding to the physical node; and
  (b) the second node is an abstraction of at least one of a second physical node included in the IoT network and a second logical node corresponding to the physical node.

Please note that Example 1 may indeed be a simulation. For example, the nodes, boundaries, partitions, couplings, boundary crossings, groupings, and/or execution of execution plans may all be simulated. These simulations may help the user evaluate what may happen when product A is introduced into the network vs product B being introduced into the network.

For example, the topology model may be similar to FIG. 4. A topology model may come in many varied forms but largely entails the way in which constituent parts (nodes) are interrelated or arranged. Embodiments do not necessarily need to manufacture or form the model provided they can access the model. The same is true with execution plans, which they are generally related to (e.g., FIG. 6). The plan may be generated elsewhere provided the plan and the topology are known to the security inference engine (see, e.g., FIG. 7) so security issues can be evaluated. Also, a boundary may include different areas of security. For example, boundaries 70, 71, 72 exist in FIG. 5. Each of the boundaries may include one or more nodes. A node may be a physical device, such as sensor 60, or a logical node, such as operator 58b. A node may enclose other nodes, such as node 58b including nodes 62, 63, 64. Boundary 70 may provide a boundary of security whereby all of elements 60, 66, and 62 are performed within a single physical SoC with no likely paths for communication beyond the boundary other than point 68. Thus, point 68 forms the boundary crossing. A boundary is not necessarily defined by physical parameters (e.g., a SoC) but may be defined along logic lines such as sandboxed process or boundaries defined by a TEE.

Put another way, "boundary" refers to the computing resources making up a TCB (Trusted Computing Base). The TCB of a computer system is the set of all hardware, firmware, and/or software components that are critical to its security, in the sense that bugs or vulnerabilities occurring inside the TCB might jeopardize the security properties of the entire system. By contrast, parts of a computer system outside the TCB must not be able to misbehave in a way that would leak any more privileges than are granted to them in accordance to the security policy. A TCB includes the totality of protection mechanisms within it, including hardware, firmware, and software, the combination of which is responsible for enforcing a computer security policy. In operating systems, the TCB typically consists of the kernel (or microkernel) and a select set of system utilities (for example, setuid programs and daemons in UNIX systems). In programming languages that have security features designed in such as Java and E, the TCB is formed of the language runtime and standard library. A TEE is a fully functional computer within a computer that is also a TCB for the computer. A TCB need not be a TEE however. It may be the subset of the operating system that implements a security decision and enforcement code. For example, the SE Linux kernel modularizes the TCB (and makes it replaceable). An IoT device may be less sophisticated than SE Linux and may have a single monolithic code image that runs on an embedded hardware platform. In this scenario the TCB is the entire device. An example of a trusted monolithic device is a smartcard or HSM.

In an IoT network each "node" is composed of some subset of computing resource (CPU, memory, IO control, interrupt handlers, storage) that is regarded as the TCB. Whenever a communication of data or control passes between TCBs the communication interface between them demarks the 'boundary'.

There are many resource partitioning techniques that can be used to implement TEE and SE (Secure Element—a.k.a. smartcard) TCBs. Some include, for example, Intel SGX, Intel CSE, Intel MemCore, Intel TXT, Intel VT-x, Intel VT-d, Intel ME as well as CPU modes such as SMM, Ring 0, Ring 1, Ring 2, Ring 3. A security controller (e.g., TPM) and IO controllers that operate in isolation from a host CPU/controller are other examples of TCBs. Peripheral I/O devices that are isolated environments may also constitute TCBs. For example a trusted keyboard or trusted HDD/SED is a TCB.

A challenge can be finding TCBs that have a full suite of functionality that allows the TCB to establish trust in another TCB such that the result is a distributed TCB. Not all of the isolation techniques above can achieve a distributed TCB result. So not all are as viable as some. However, an embodiment instructs the IoT network designer on which isolation technologies are most capable of constructing a distributed TCB.

A TCB may be expanded to include other TCB elements until there is a combination that implements all of the functionality needed. Such a TCB is able to form a distributed TCB with some other TCB of similar definition.

Further, determining a first credential and a first access control list (ACL) are needed for communications across the first boundary crossing may simply entail bringing a boundary crossing to the attention of the user using a graphical user interface. However, there is enough context in the application design to infer the ACL policy. Hence the tool (security inference engine) will be able to generate the ACL. The user may wish to impose tighter constraints in which case the tool can expose a UI that allows this. Thus, some embodiment may advise an ACL is desirable and others may provide the ACL.

Also, in an embodiment an execution plan is a compilation of the logical to physical mapping resulting in a distributed execution plan that respects the physical partitioning of resources that make up the distributed TCB such that each endpoint is provisioned with a credential and ACL that allows secure communication/message exchange between endpoints.

Another version of Example 1 includes at least one computer readable storage medium comprising instructions that when executed enable a system to: access an internet-of-things (IoT) network topology model that is partitioned into first and second nodes; determine a first execution plan that, when executed, couples the first and second nodes together to execute a first task; determine the first node is within a first logical boundary and the second node is within a second logical boundary; determine a first boundary crossing exists where the first execution plan, when executed, will cross from the first logical boundary into the second logical boundary; and in response to determining the first boundary crossing, determine a first credential and a first access control list (ACL) are needed for communications between the first and second nodes; wherein (a) the first node is an abstraction of at least one of a first physical node included in the IoT network and a first logical node corresponding to the physical node; and (b) the second node is an abstraction of at least one of a second physical node included in the IoT network and a second logical node corresponding to the physical node.

Another version of Example 1 include at least one computer readable storage medium comprising instructions that when executed enable a system to: access an internet-of-things (IoT) network topology model that is partitioned into first and second nodes; determine a first execution plan that, when executed, couples the first and second nodes together to execute a first task; determine the first node is within a first logical boundary and the second node is within a second logical boundary; determine a first boundary crossing exists where the first execution plan, when executed, will cross from the first logical boundary into the second logical boundary; and in response to determining the first boundary crossing, determine a first credential and a first access control list (ACL) are needed for communications across the first boundary crossing; wherein (a) the first node corresponds to at least one of a first physical node included in the IoT network and a first logical node corresponding to the physical node; and (b) the second node corresponds to at least one of a second physical node included in the IoT network and a second logical node corresponding to the physical node.

In example 2 the subject matter of Example 1 can optionally include instructions that when executed enable the system to provision the first credential to the first node.

For example, "provisioning" does not necessarily mean generating a key and inserting the key into a memory of a device. Provisioning, as shown in Example 5, may instead constitute alerting a service that a key is needed at a certain location and letting the service then attend to actually getting a key in place at a node. Thus, provisioning may entail implementing, albeit partially and in cooperation with other facets such as a provisioning service, the actual key or ACL in a physical node. As explained in Example 18, the provisioning may be thought of as indirect in some embodiments (e.g., may rely on alerting a provisioning service to actually provision keys) or direct in other embodiments.

In another version of example 2 the subject matter of the Example 1 can optionally include, instructions that when executed enable the system to provision the first credential to the first physical node.

In example 3 the subject matter of the Examples 1-2 can optionally include wherein the first physical node includes at least one a sensor, an actuator, and a processor and the first node is an abstraction of the first physical node.

In example 4 the subject matter of the Examples 1-3 can optionally include wherein the first credential includes a first encryption key and the first ACL.

In example 5 the subject matter of the Examples 1-4 can optionally include wherein provisioning the first credential to the first physical node includes informing an access management service to provide the first credential to the first node.

An "access management service" is defined in the OIC SECURITY CANDIDATE SPECIFICATION PROJECT B (V0.9.9) (available at ***://openinterconnect.org/developer-resources/specs/). Other industry terminology that is similar includes Identity Provider (IdP); Identity and Access Management (IAM) server; Authorization Server (AS); Policy Decision Point (PDP)/Policy Enforcement Point (PEP)/Policy Authoring Point (PAP). Allseen alliance uses the term Security Service (SS).

In another version of example 5 the subject matter of the Examples 1-4 can optionally include wherein provisioning the first credential to the first physical node includes informing an access management service regarding the first credential.

In example 6 the subject matter of the Examples 1-5 can optionally include instructions that when executed enable the system to determine the first node is at least one of a first source node, a first sink node, and a first operator node.

In example 7 the subject matter of the Examples 1-6 can optionally include instructions that when executed enable the system to determine the first node is a first operator node and the second node is a second operator node.

In example 8 the subject matter of the Examples 1-7 can optionally include instructions that when executed enable the system to determine: the first operator node couples output from a physical node to the second operator node; and the second operator node couples output from the first operator node to another physical node.

For example, in FIG. 5 nodes 62 and 64 may be operator nodes that couple physical nodes 60 to 65.

In another version of example 8 the subject matter of the Examples 1-7 can optionally include instructions that when executed enable the system to determine: the first operator node couples output from a physical node to the second operator; and the second operator node couples output from the first operator to another physical node.

In example 9 the subject matter of the Examples 1-8 can optionally include instructions that when executed enable the system to: determine a second execution plan that, when executed, couples the first and second nodes together to execute the first task; determine the first node is within a third logical boundary; determine a second boundary crossing exists where the second execution plan, when executed, will cross from the third logical boundary into at least one of the second logical boundary and a fourth logical boundary; and in response to determining the second boundary crossing exists, determine a second ACL corresponding to communications between the first and second nodes.

For example, this may allow for different simulations to determine alternative routes for sake of redundancy. For example, in FIG. 5 another plan may provide that element 62 is handled in the cloud and therefore, node 60 may still be in a boundary 70 but element 62 may be in another boundary ("third boundary") separate from boundaries 70, 71, 72. As a result, ACLs and keys may be needed at boundary crossings between boundary 70 and the third boundary and the crossing between boundary 72 and the third boundary. The "fourth boundary" of the example may exist if, for example, a new boundary includes element 68 in a boundary that has different boundaries (smaller or larger) than boundary 72.

In example 10 the subject matter of the Examples 1-9 can optionally include instructions that when executed enable the system to simulate execution of the first and second execution plans.

Example 10 is not meant to mean in any way that Example 1 does not include simulations of execution plans, boundary formations, couplings, and the like.

In example 11 the subject matter of the Examples 1-10 can optionally include instructions that when executed enable the system to: determine first physical performance characteristics for the first logical boundary; determine second physical performance characteristics for third logical boundary; in response to determining the second boundary crossing exists, determine a second credential is needed for communications across the second boundary crossing; wherein the first and second credentials are unequal based on the first and second physical performance characteristics being unequal.

For example, in determining a key size the security modeling engine may consider the resources of nodes. If the second node in the example does not have the capacity to handle PKI keys then symmetric keys may be used instead. Other factors that may be considered in determining appropriate keys may concern the ability for a node to generate randomness (e.g., does the node include a random number generator), power available to the node, throughput capacity of the node, bandwidth of the node, whether the node is include within a TPM, and the like. This "context" helps inform the security model which in turn drives whether keys are used, types of keys to be used, and the like. This context may be known in the "capability abstraction" of level 20 of FIG. 4.

In another version of example 11 the subject matter of the Examples 1-10 can optionally include instructions that when executed enable the system to: determine first physical performance characteristics for the first logical boundary; determine second physical performance characteristics for third logical boundary; in response to determining the second boundary crossing, determine a second credential is needed for communications between the first and second nodes; wherein the first and second credentials are unequal based on the first and second physical performance characteristics being unequal.

In example 12 the subject matter of the Examples 1-11 can optionally include instructions that when executed enable the system to: determine the first execution plan failed; and determine the second execution plan in response to determining the first execution plan failed.

In example 13 the subject matter of the Examples 1-12 can optionally include instructions that when executed enable the system to visually depict, with a user interface, the first and second logical boundaries and the first and second nodes.

In example 14 the subject matter of the Examples 1-13 can optionally include instructions that when executed enable the system to: determine the first execution plan, when executed, couples a third node to the second node to execute the first task; determine the third node is within a third logical boundary; determine a second boundary crossing exists where the first execution plan, when executed, will cross from the third logical boundary into the second logical boundary; and in response to determining the second boundary crossing exists, determine a second credential and a second ACL are needed for communications across the second boundary crossing.

For example, the third node may include node 63 of FIG. 5. The second node may be node 64 and the first node may be node 62. The third boundary may be boundary 71. The second boundary crossing may exist at point 69.

In another version of example 14 the subject matter of the Examples 1-13 can optionally include instructions that when executed enable the system to: determine the first execution plan, when executed, couples a third node to the second node to execute the first task; determine the third node is within a third logical boundary; determine a second boundary crossing exists where the first execution plan, when executed, will cross from the third logical boundary into the second logical boundary; and in response to determining the second boundary crossing exists, determine a second credential and a second ACL are needed for communications between the third and second nodes.

In example 15 the subject matter of the Examples 1-14 can optionally include wherein the first node is an abstraction of the first logical node and the first logical node is at least one of a sandboxed process and a trusted execution environment (TEE).

Example 16 include at least one computer readable storage medium comprising instructions that when executed enable a system to determine: a topology for an internet-of-things (IoT) network having first and second nodes; the first and second nodes are within first and second logical boundaries of the topology; a first boundary crossing exists when a first execution plan, when executed, crosses from the first logical boundary into the second logical boundary; and wherein (a) the first node is an abstraction of at least one of a first physical node included in the IoT network and a first logical node corresponding to the first physical node; and (b) the second node is an abstraction of at least one of a second physical node included in the IoT network and a second logical node corresponding to the second physical node.

In example 17 the subject matter of the Example 16 can optionally include instructions that when executed enable the system to determine: the first node is within a third logical boundary; and a second boundary crossing exists where a second execution plan, when executed, crosses from the third logical boundary into at least one of the second logical boundary and a fourth logical boundary.

In example 18 the subject matter of the Examples 16-17 can optionally include instructions that when executed enable the system to indirectly provision: a first credential for communications across the first boundary crossing; and a second credential for communications across the second boundary crossing.

In another version of example 18 the subject matter of the Examples 16-17 can optionally include instructions that when executed enable the system to determine: a first credential for communications across the first boundary crossing; and a second credential for communications across the second boundary crossing.

Determining the credential may include creating and providing the credential to nodes, instructing a service to provide the credential to a node or nodes, indicating a credential is needed (or at least a possibility to consider), that the crossing is a likely spot for enhanced security (e.g., use of a key and/or ACL), and the like.

Example 19 includes a device comprising: at least one hardware processor; a security inference engine, coupled to the at least one processor, including at least one non-transitory storage medium having instructions stored thereon for causing the at least one hardware processor to determine: a topology for an internet-of-things (IoT) network having first and second nodes; the first and second nodes are within first and second logical boundaries of the topology; a first boundary crossing exists when a first execution plan, when executed, crosses from the first logical boundary into the second logical boundary; and wherein (a) the first node is an abstraction of at least one of a first physical node included in the IoT network and a first logical node corresponding to the first physical node; and (b) the second node is an abstraction of at least one of a second physical node included in the IoT network and a second logical node corresponding to the second physical node.

In example 20 the subject matter of the Examples 16-19 can optionally include wherein the at least one hardware processor is to perform operations comprising determining: the first node is within a third logical boundary; and a second boundary crossing exists where a second execution plan, when executed, crosses from the third logical boundary into at least one of the second logical boundary and a fourth logical boundary.

Example 21 includes at least one computer readable storage medium comprising instructions that when executed enable a system to: present, in a user interface of an authoring tool, a plurality of levels of abstraction for a network having a plurality of devices; receive information from a user regarding a subset of the plurality of devices to be provisioned with one or more security keys and an access control policy; automatically provision a key schedule for the subset of the plurality of devices in the network based on the user input and a topological context of the network; and automatically provision the access control policy for the subset of the plurality of devices in the network based on the user input and the topological context of the network.

In example 22 the subject matter of the Example 21 can optionally include instructions that when executed enable the system to perform one or more simulations regarding a design of the network by the authoring tool.

In example 23 the subject matter of the Examples 21-22 can optionally include instructions that when executed enable the system to, responsive to acceptance of the design of the network by the user, automatically provision the security keys and the access control policy to the subset of devices.

Example 24 includes a method that includes: presenting, in a user interface of an authoring tool, a plurality of levels of abstraction for a network having a plurality of devices; receiving information from a user regarding a subset of the plurality of devices to be provisioned with one or more security keys and an access control policy; automatically provisioning a key schedule for the subset of the plurality of devices in the network based on the user input and a topological context of the network; and automatically provisioning the access control policy for the subset of the plurality of devices in the network based on the user input and the topological context of the network.

Example 25 includes at least one computer readable storage medium comprising instructions that when executed enable a system to: present, in a user interface of an authoring tool, at least one level of abstraction for a network having a plurality of devices; receive information from a user regarding a subset of the plurality of devices to be provisioned with one or more security keys and an access control policy; automatically provision a key schedule for the subset of the plurality of devices in the network based on the information and a topological context of the network; and automatically provision the access control policy for the subset of the plurality of devices in the network based on the information and the topological context of the network.

In example 26 the subject matter of the Example 25 can optionally include instructions that when executed enable the system to determine the subset of the plurality of devices in the network are within a logical boundary of the at least one level of abstraction.

In example 27 the subject matter of the Examples 25-26 can optionally include instructions that when executed enable the system to determine a boundary crossing exists when a first execution plan, when executed, crosses the logical boundary.

In example 28 the subject matter of the Examples 25-27 can optionally include wherein the plurality of devices in the network are abstractions of at least one of a physical nodes and logical nodes.

In example 29 the subject matter of the Examples 25-28 can optionally include wherein the receiving information from the user comprises information selecting a first instance of node from a plurality of nodes.

For example, a user may select sensor made by vendor A from a group including sensors made by vendors A and B. For example, a user may select a first sensor from a group including first and second sensors.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer readable storage medium comprising instructions that when executed enable a system to:
   access an internet-of-things (IoT) network topology model that is partitioned into first and second nodes;
   determine a first execution plan that, when executed, couples the first and second nodes together to execute a first task;
   determine the first node is within a first logical boundary and the second node is within a second logical boundary;
   determine a first boundary crossing exists where the first execution plan, when executed, crosses from the first logical boundary into the second logical boundary; and
   in response to determining the first boundary crossing, determine a first credential and a first access control list (ACL) are needed for communications across the first boundary crossing;
   determine a second execution plan that, when executed, couples the first and second nodes together to execute the first task;
   determine the first node is within a third logical boundary;
   determine a second boundary crossing exists where the second execution plan, when executed, crosses from the third logical boundary into at least one of the second logical boundary or a fourth logical boundary; and
   in response to determining the second boundary crossing exists, determine a second ACL is needed for communications across the second boundary crossing;
   wherein (a) the first node is an abstraction of at least one of a first physical node included in the IoT network or a first logical node corresponding to the first physical node; and (b) the second node is an abstraction of at least one of a second physical node included in the IoT network or a second logical node corresponding to the second physical node.

2. The at least one computer readable storage medium of claim 1, further comprising instructions that when executed enable the system to indirectly provision the first credential to the first node.

3. The at least one computer readable storage medium of claim 2, wherein the first physical node includes at least one of a sensor, an actuator, or a processor and the first node is an abstraction of the first physical node.

4. The at least one computer readable storage medium of claim 2, wherein the first credential includes a first encryption key and the first ACL.

5. The at least one computer readable storage medium of claim 2, wherein provisioning the first credential to the first physical node includes informing an access management service to provide the first credential to the first node.

6. The at least one computer readable storage medium of claim 1, further comprising instructions that when executed enable the system to determine the first node is at least one of a first source node, a first sink node, or a first operator node.

7. The at least one computer readable storage medium of claim 1, further comprising instructions that when executed enable the system to determine the first node is a first operator node and the second node is a second operator node.

8. The at least one computer readable storage medium of claim 7, further comprising instructions that when executed enable the system to determine:
   the first operator node couples output from a physical node to the second operator node; and the second operator node couples output from the first operator node to another physical node.

9. The at least one computer readable storage medium of claim 1, further comprising instructions that when executed enable the system to simulate execution of the first and second execution plans.

10. The at least one computer readable storage medium of claim 1, further comprising instructions that when executed enable the system to:
determine first physical performance characteristics for the first logical boundary;
determine second physical performance characteristics for the third logical boundary;
in response to determining the second boundary crossing exists, determine a second credential is needed for communications across the second boundary crossing;
wherein the first and second credentials are unequal based on the first and second physical performance characteristics being unequal.

11. The at least one computer readable storage medium of claim 1, further comprising instructions that when executed enable the system to:
determine the first execution plan failed; and
determine the second execution plan in response to determining the first execution plan failed.

12. The at least one computer readable storage medium of claim 1, further comprising instructions that when executed enable the system to visually depict, with a user interface, the first and second logical boundaries and the first and second nodes.

13. The at least one computer readable storage medium of claim 1, further comprising instructions that when executed enable the system to:
determine the first execution plan, when executed, couples a third node to the second node to execute the first task;
determine the third node is within a fifth logical boundary;
determine another boundary crossing exists where the first execution plan, when executed, crosses from the fifth logical boundary into the second logical boundary; and
in response to determining the another boundary crossing exists, determine at least one of another credential or another ACL is needed for communications across the another boundary crossing.

14. The at least one computer readable storage medium of claim 1, wherein the first node is an abstraction of the first logical node and the first logical node is at least one of a sandboxed process or a trusted execution environment (TEE).

15. At least one non-transitory computer readable storage medium comprising instructions that when executed enable a system to:
access an internet-of-things (IoT) network topology model that is partitioned into first and second nodes;
determine a first execution plan that, when executed, couples the first and second nodes together to execute a first task;
determine the first node is within a first logical boundary and the second node is within a second logical boundary;
determine a first boundary crossing exists where the first execution plan, when executed, crosses from the first logical boundary into the second logical boundary; and
in response to determining the first boundary crossing, determine at least one of a first credential or a first access control list (ACL) is needed for communications across the first boundary crossing;
determine the first execution plan, when executed, couples a third node to the second node to execute the first task;
determine the third node is within a third logical boundary;
determine a second boundary crossing exists where the first execution plan, when executed, crosses from the third logical boundary into the second logical boundary; and
in response to determining the second boundary crossing exists, determine at least one of a second credential or a second ACL is needed for communications across the second boundary crossing;
wherein (a) the first node is an abstraction of at least one of a first physical node included in the IoT network or a first logical node corresponding to the first physical node; and (b) the second node is an abstraction of at least one of a second physical node included in the IoT network or a second logical node corresponding to the second physical node.

16. The at least one computer readable storage medium of claim 15, further comprising instructions that when executed enable the system to:
determine the first credential is needed for communications across the first boundary crossing; and
indirectly provision the first credential to the first node.

17. The at least one computer readable storage medium of claim 16, wherein the first physical node includes at least one of a sensor, an actuator, or a processor and the first node is an abstraction of the first physical node.

18. The at least one computer readable storage medium of claim 16, wherein the first credential includes a first encryption key.

19. The at least one computer readable storage medium of claim 16, wherein provisioning the first credential to the first physical node includes informing an access management service to provide the first credential to the first node.

20. The at least one computer readable storage medium of claim 15, further comprising instructions that when executed enable the system to determine the first node is at least one of a first source node, a first sink node, or a first operator node.

21. The at least one computer readable storage medium of claim 15, further comprising instructions that when executed enable the system to determine the first node is a first operator node and the second node is a second operator node.

22. The at least one computer readable storage medium of claim 21, further comprising instructions that when executed enable the system to determine:
the first operator node couples output from a physical node to the second operator node; and
the second operator node couples output from the first operator node to another physical node.

23. The at least one computer readable storage medium of claim 15, further comprising instructions that when executed enable the system to visually depict, with a user interface, the first and second logical boundaries and the first and second nodes.

24. The at least one computer readable storage medium of claim 15, wherein the first node is an abstraction of the first logical node and the first logical node is at least one of a sandboxed process or a trusted execution environment (TEE).

* * * * *